US008432465B2

United States Patent
Kramp et al.

(10) Patent No.: US 8,432,465 B2
(45) Date of Patent: Apr. 30, 2013

(54) SYSTEM AND METHOD FOR ESTABLISHING ZOOM SETTINGS FOR DISPLAY OF AN ANATOMICAL IMAGE

(75) Inventors: George Kramp, Elmhurst, IL (US); John Baumgart, Hoffman Estates, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1692 days.

(21) Appl. No.: 11/623,495

(22) Filed: Jan. 16, 2007

(65) Prior Publication Data
US 2008/0074511 A1 Mar. 27, 2008

Related U.S. Application Data

(60) Provisional application No. 60/847,045, filed on Sep. 25, 2006.

(51) Int. Cl.
*H04N 5/262* (2006.01)
*H04N 5/232* (2006.01)

(52) U.S. Cl.
USPC ............... 348/240.99; 348/240.1; 348/240.2; 348/240.3; 348/211.7; 348/211.9

(58) Field of Classification Search ............... 348/240.1, 348/240.2, 240.3, 240.99, 211.7, 211.9
See application file for complete search history.

(56) References Cited

U.S. PATENT DOCUMENTS

| | | | | |
|---|---|---|---|---|
| 5,394,455 | A * | 2/1995 | Roeck et al. ................. | 378/98.3 |
| 6,704,048 | B1 * | 3/2004 | Malkin et al. ............... | 348/240.2 |
| 7,783,094 | B2 * | 8/2010 | Collins et al. ................. | 382/128 |
| 2006/0170793 | A1 * | 8/2006 | Pasquarette et al. ..... | 348/240.99 |
| 2006/0187322 | A1 * | 8/2006 | Janson et al. ............ | 348/240.99 |
| 2007/0120988 | A1 * | 5/2007 | Akiyama et al. .......... | 348/240.99 |
| 2008/0009697 | A1 * | 1/2008 | Haider et al. ................. | 600/407 |

* cited by examiner

*Primary Examiner* — Ranodhi Serrao
(74) *Attorney, Agent, or Firm* — Alexander J Burke (57) ABSTRACT

A system for selecting a zoom size of an anatomical image for display includes an image detector having a pre-defined field of view defining a maximum and minimum analog zoom fields of view corresponding to maximum and minimum analog zoom settings for at least one anatomical image; an image display displaying the anatomical image within the pre-defined field of view; a processing unit providing a selection of at least one anatomical image; and a network configured to interface the detector with the processing unit and the image display with the processing unit. The system enables establishment of at least one intervening selectable zoom setting corresponding to an intervening selectable zoom field of view between the maximum and minimum analog zoom fields of view, thereby establishing a first user profile. A second user profile overriding the first user profile can be established. A corresponding method is also disclosed.

22 Claims, 7 Drawing Sheets

SYSTEM AND METHOD FOR ESTABLISHING ZOOM SETTINGS FOR DISPLAY OF AN ANATOMICAL IMAGE

PRIORITY CLAIM TO RELATED APPLICATION

This application claims priority under 35 U.S.C. §119 to U.S. Provisional Patent Application Ser. No. 60/847,045 filed on Sep. 25, 2006 entitled "Care Collimation Pre-Programming", the entire contents of which are incorporated herein by reference.

CROSS-REFERENCE TO RELATED APPLICATIONS

This application cross-references U.S. Pat. No. 7,133,492 B2, by Kramp et al., entitled "Method for Reducing Radiation Exposure During Patient Positioning," issued Nov. 7, 2006, the entire contents of which are incorporated herein by reference.

BACKGROUND

1. Technical Field

The present disclosure relates to medical imaging systems.

2. Discussion of Related Art

Currently, a medical imaging device is sold with factory set (preset) zoom settings. When a user uses the medical imaging device and has to use a zoom setting, the user typically uses the preset zoom settings. The user then adjusts the preset zoom settings to get an ideal setting for that particular situation.

The user will typically repeat the procedure every time the user needs to use a zoom feature. This can be inconvenient for the user because the user is limited to the factory zoom settings. For new users, this feature may be fine. However, experienced users may find being limited to factory presets highly cumbersome.

Thus, this is a need for users to be able to get zoom settings for medical imaging devices, and not be limited only to factory preset zoom settings.

SUMMARY

The present disclosure relates to a system for selecting a zoom size of an anatomical image for display. The system includes an image detector having a pre-defined field of view, with the pre-defined field of view defining a maximum analog zoom field of view corresponding to a maximum analog zoom setting and a minimum analog zoom field of view corresponding to a minimum analog zoom setting for at least one anatomical image; an image display displaying the at least one anatomical image within the pre-defined field of view; a processing unit providing a selection of at least one anatomical image; and a network configured to interface the detector with the processing unit and the image display with the processing unit. The system is configured to enable establishment of at least one intervening selectable zoom setting corresponding to an intervening selectable zoom field of view between the maximum analog zoom field of view and the minimum analog zoom field of view, thereby establishing a user profile. At least the at least one intervening zoom setting may be overridden. The maximum analog zoom setting, the at least one intervening selectable zoom setting, and the minimum analog zoom setting may be displayed in one of a descending order and an ascending order on the image display.

The system may further include at least two intervening selectable field of views displayed on said image display, wherein a selected intervening selectable zoom setting overrides one of the at least two intervening selectable zoom settings. The selected intervening selectable zoom setting may override one of the at least two intervening selectable zoom settings that is closest in dimensional value to the selected intervening selectable zoom setting. The user profile may be a first user profile and the minimum analog zoom setting, the selected intervening selectable zoom setting overriding one of the at least two intervening selectable zoom settings; at least another one of the at least two intervening selectable zoom settings; and the maximum analog zoom setting may establish at least a second user profile overriding the first user profile.

The system may be configured upon log-off to restore the first user profile upon subsequent log-on. The first user profile may be a default user profile. The system may also be configured upon log-off to maintain the at least a second user profile upon subsequent log-on. Additionally, the system may be configured to inhibit an increase in zoom setting of the selected intervening selectable zoom setting overriding one of the at least two intervening selectable zoom settings. Also, the system may be configured to reset the pre-defined field of view by re-defining, for at least one anatomical image, at least one of the pre-defined field of view defining the maximum analog zoom field of view corresponding to a maximum analog zoom setting; and the pre-defined field of view defining the minimum analog zoom field of view corresponding to a minimum analog zoom setting.

The present disclosure relates also to a method for selecting a zoom size of an anatomical image for display. The method includes the steps of providing an image detector having a pre-defined field of view, with the pre-defined field of view defining a maximum analog zoom field of view corresponding to a maximum analog zoom setting and a minimum analog zoom field of view corresponding to a minimum analog zoom setting for at least one anatomical image; and an image display displaying the at least one anatomical image within the pre-defined field of view; and establishing at least one intervening selectable zoom setting corresponding to an intervening selectable field of view between the maximum analog zoom and the minimum analog zoom, thereby establishing a user profile. The method may further include the step of enabling at least the at least one intervening zoom setting to be overridden. The method may further include the step of ordering the maximum analog zoom setting, the at least one intervening selectable zoom setting, and the minimum analog zoom setting in one of a descending order and an ascending order.

In addition, the method may further include the steps of providing at least two intervening selectable zoom settings, and overriding one of the at least two intervening selectable zoom settings by a selected intervening selectable zoom setting. The method may be implemented wherein the selected intervening selectable zoom setting overrides one of the at least two intervening selectable zoom settings closest in dimensional value to the selected intervening selectable zoom setting. Furthermore, the method may further include the step of establishing at least a second user profile overriding the first user profile, the at least a second user profile being the minimum analog zoom setting; the selected intervening selectable zoom setting; at least another one of the at least two intervening selectable zoom settings; and the maximum analog zoom setting.

Following log-off, the method may further include the step of restoring the first user profile upon subsequent log-on. The method may be implemented wherein the first user profile is a default user profile. The method may further include the step of, following log-off, maintaining the second user profile upon subsequent log-on. Additionally, the method may further include the step of inhibiting an increase in zoom setting of the selected intervening selectable zoom setting overriding one of the at least two intervening selectable zoom settings. Also, the method may further include the step of resetting the pre-defined field of view by re-defining, for at least one anatomical image, at least one of (a) the pre-defined field of view defining the maximum analog zoom field of view corresponding to a maximum analog zoom setting; and (b) the pre-defined field of view defining the minimum analog zoom field of view corresponding to a minimum analog zoom setting.

BRIEF DESCRIPTION OF THE DRAWINGS

The accompanying drawings, which are incorporated in and constitute a part of this specification, illustrate embodiments of the disclosure and, together with a general description of the disclosure given above, and the detailed description of the embodiments given below, serve to explain the principles of the disclosure.

DETAILED DESCRIPTION OF EXEMPLARY EMBODIMENTS

Exemplary embodiments of the present disclosure will now be described in detail with reference to the figures, in which like reference numerals identify corresponding elements throughout the several views.

Although an anatomical imaging system which employs an analog zoom without the need for preset zoom size settings has been disclosed in the above-referenced U.S. Provisional Patent Application Ser. No. 60/847,045, it may be advantageous for the user to be provided with pre-defined intermediate selectable or digital zoom settings.

Figure 1:
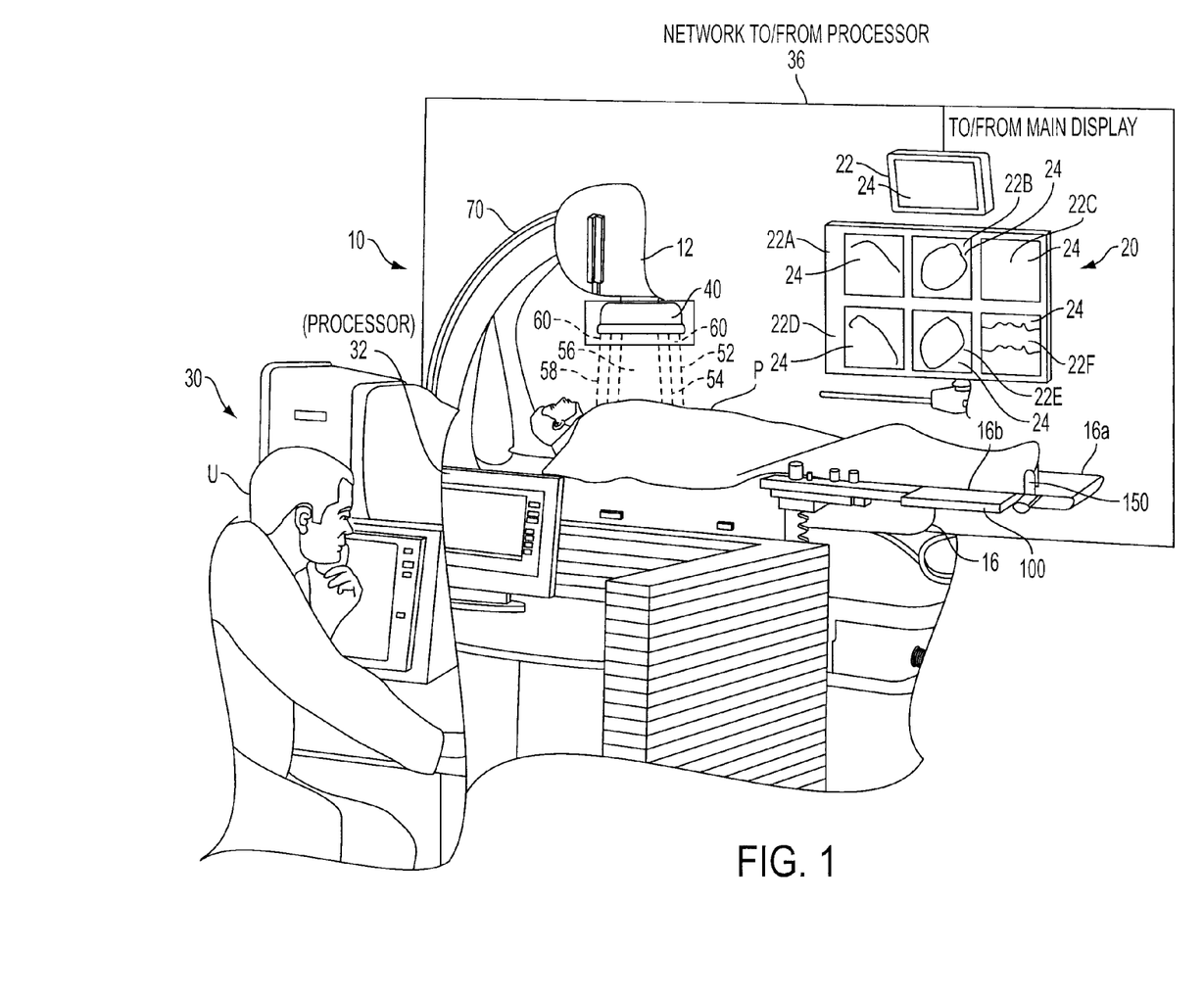
FIG. 1 is an overview of an exemplary angiographic X-ray system in a patient examination room illustrating a system user, a patient lying on a bed, an image detector, main X-ray displays and a touch-screen display at the bedside.
Figure 2:
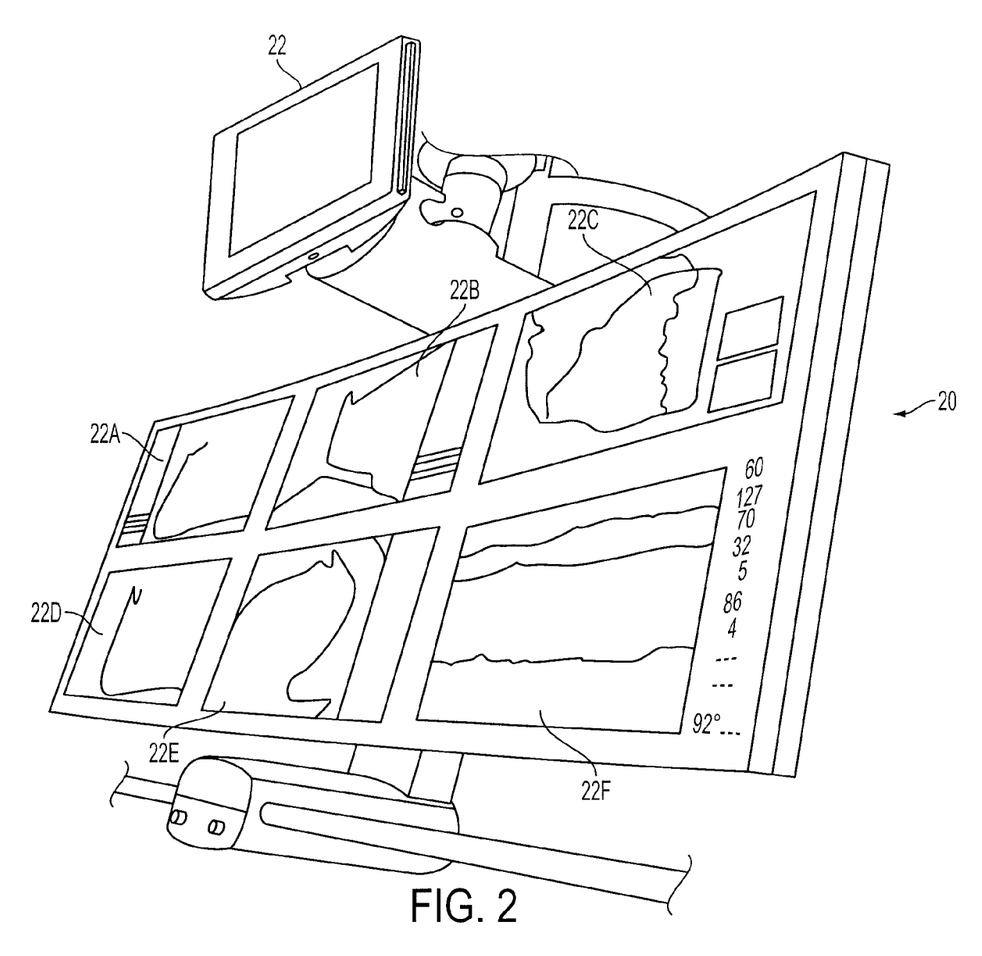
FIG. 2 is a perspective view of the main panel displays having images subject to being selected for selectable digitally pre-defined zoom settings according to the present disclosure.
Figure 3:
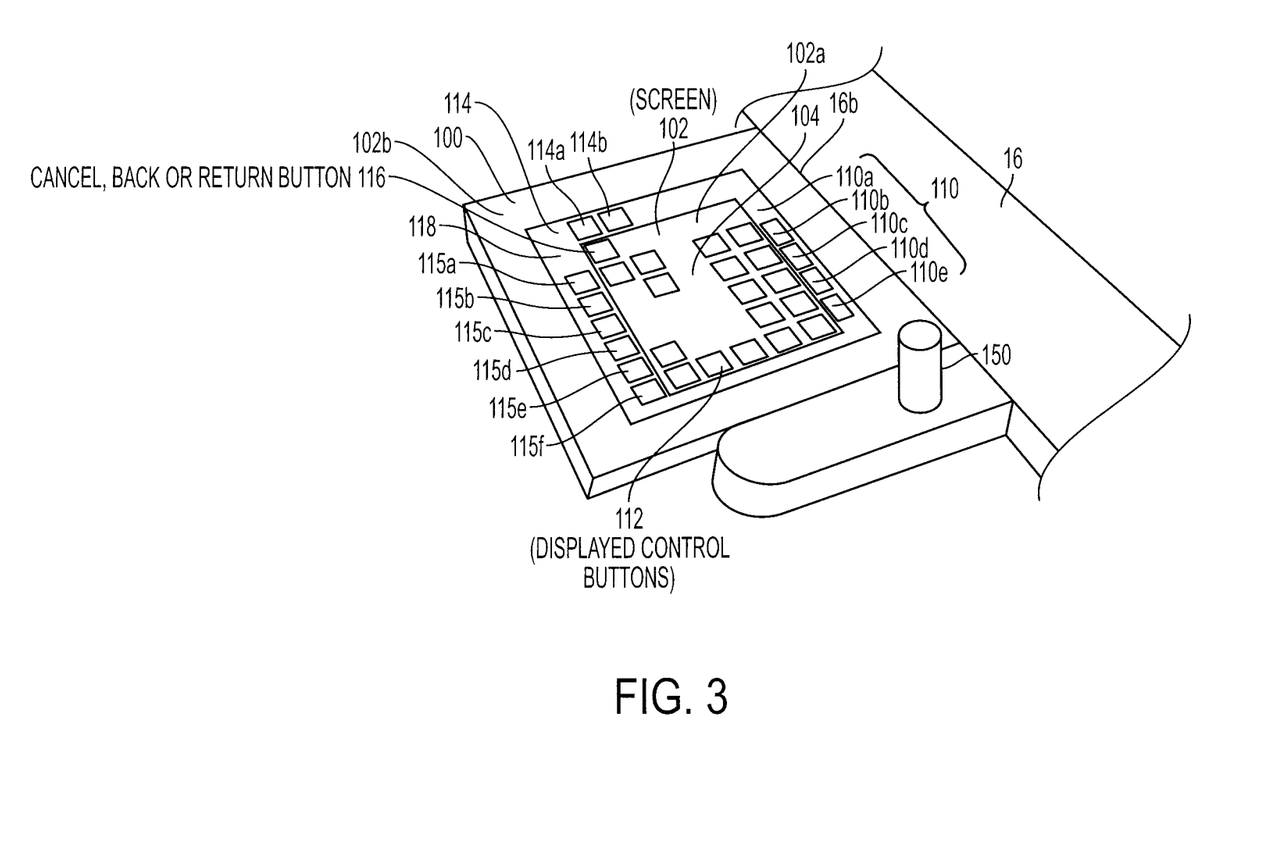
FIG. 3 is a perspective view of a touch-screen display before or after a selection process of digitally pre-defined zoom settings for the anatomical images.

Referring to FIGS. 1-3, there is illustrated an exemplary angiographic x-ray anatomical imaging system 10 as disposed in a patient examination room. A patient P is positioned on an examination bed 16. The x-ray or radiographic system 10 includes an image intensifier or an image detector 40, hereinafter referred to as image detector 40, supported by a support structure 12 and positioned over the examination bed 16. The image detector 40 is positioned over the patient P and over the examination bed 16 to detect the x-rays emitted from an x-ray source (not shown) under the bed 16 that enable recording the anatomical images. The radiographic system 10 includes a bank of main panel displays 20, e.g., overhead panel 22 and individual panel displays, e.g. panel displays 22A, 22B, 22C, 22C, 22D, 22E and 22F. The patient P and the main panel displays 20 are within view of a user U, e.g., a physician, seated at a control console 30. The main panel displays 20 are disposed on a distal side 16a of the examination bed 16 with respect to the user U.

As best illustrated in FIG. 3, the bed 16 includes a touch-screen display 100 with a joystick control 150, each disposed on a proximal side 16a of the examination bed 16. The touch-screen display 100 includes a screen 102. The screen 102 may be subdivided into a main portion 102a and a border portion 102b around the main portion 102a.

The radiographic system 10 further includes a processing unit 32 that may be located at the control console 30 and a network 36 that is configured to interface the main image display 20 with the processing unit 32 and is also configured to interface the touch-screen display 100 with the processing unit 32.

An upper edge of the border portion 102b of the screen 102 includes a strip 110 of touch buttons or tabs, e.g., touch buttons 110a, 110b, 110c, 110d, and 110e, that is disposed proximate to the proximal edge 16b of the bed 16. The border portion 102b further includes a strip 114 of touch buttons or tabs, e.g., touch buttons 114a and 114b disposed on the left side of the border portion 102b and a strip 115 of touch buttons 115a, 115b, 115c, 115d, 115e and 115f disposed on the bottom side of the border portion 102b.

When one of the touch buttons, e.g., touch button 110b, is pressed on the screen 102, a particular series 112 of control buttons is displayed as display 104 on the main portion 102a of the screen 102, as shown. If another touch button, e.g., touch button 110d is touched, a different series of control buttons (not shown) is displayed on the main portion 102a of the screen 102. However, the configuration, function, and position of touch buttons 114 on the border portion 102b does not change by touching the buttons 110a through 110e. In addition to the strips 110 and 114 of touch buttons, the screen 102 of the touch-screen display 100 further includes a "back", "cancel", or "return" button 116 that may be disposed in the border region 102b.

The touch-screen display 100 may include, in addition to the joystick 150, a track ball 152 and/or a mouse 154. The mouse 154 may be wired to the processor 32 or may be operatively coupled to the processor 32 wirelessly or contactlessly, e.g., via optical, electromagnetic or acoustic waves. The mouse 154 may also be configured as a "built-in" touch pad and scroll design available for portable computers. The mouse 154 may be configured to interface concurrently with the main display 20 and the touch-screen display 100 via the processing unit 32 and the network 36 that is configured to interface the main image display 20 with the processing unit 32 and that is configured to interface the touch-screen display 100 with the processing unit 32.

The touch-screen display 100 may also be operatively coupled to the processor 32 via a stylus 160 or light pen 162

(concurrently illustrated). The screen 102 may also display on at least one edge one or more thumbnails 130 that may be pressed for selection of zoom format settings.

Figure 4:
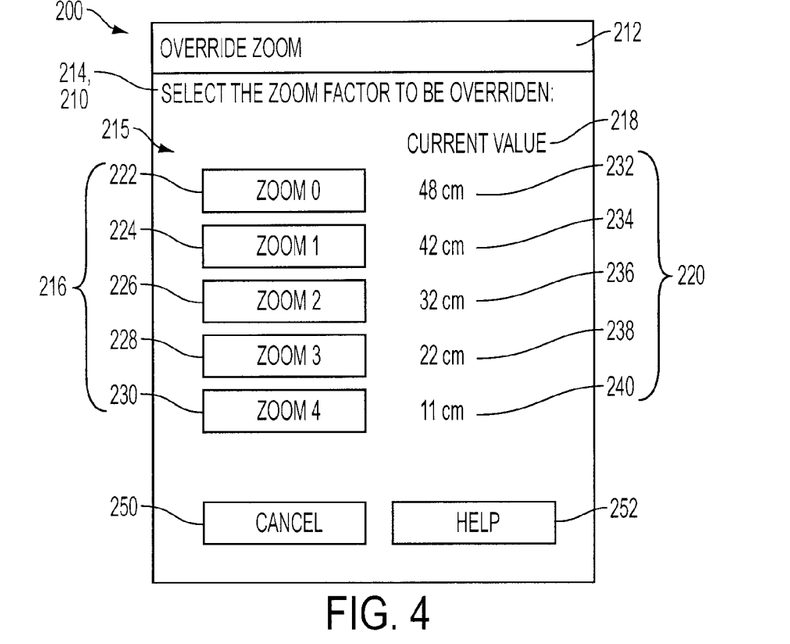
FIG. 4 is an exemplary display of a zoom setting override selection display for display of the anatomical images according to the present disclosure.

Referring to FIGS. 4-8, there is disclosed a sub-system for selecting a zoom size of an anatomical image for display according to the present disclosure. More particularly, the sub-system 200 is a system included within the system 10. The sub-system 200 includes the image detector 40 having a pre-defined field of view 52 (see FIG. 1) with respect to the patient P. Referring to FIG. 4, the sub-system 200 includes a display 210 that can be displayed either on the main panel display 20 (see FIG. 1) or on the touch-screen display 100. The display 210 may display a menu header 212 labeled "Override Zoom" corresponding to the zoom override menu displayed on the display 210. The zoom override menu 212 includes an action prompt identifier 214 labeled "Select the Zoom factor to be overridden," and a set 216 of zoom settings, illustrated, for example, as Zoom 0, Zoom 1, Zoom 2, Zoom 3 and Zoom 4. Thus, the zoom override menu 212 may be displayed either on the main panel display 20 or on the touch-screen display 100.

Figure 5:
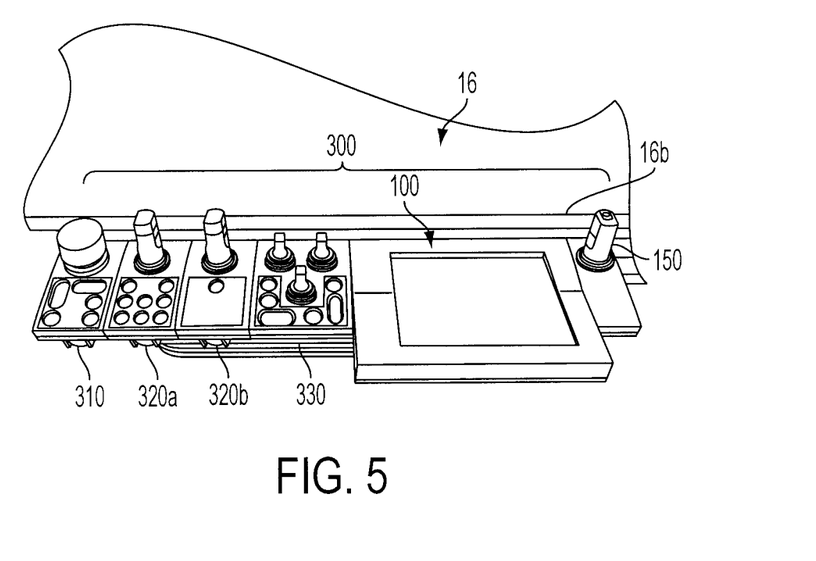
FIG. 5 is a perspective view of an exemplary set of control consoles positioned at the bed of FIG. 1 for controlling various system operations.

FIG. 5 illustrates an exemplary set 300 of control consoles positioned at the side 16b of the bed 16 (see FIG. 1) for controlling various system operations. The set 300 of control consoles may include a first control console 310 that controls the position of the patient bed 16. Control consoles 320a and 320b may control C-arm 70 (see FIG. 1) and the level of the support structure 12 for the detector 40. Control console 330 may control at least the zoom setting override menu 212 described above. The set 300 of control consoles also may include the touch-screen display 100 with the joystick control 150.

Figure 6:
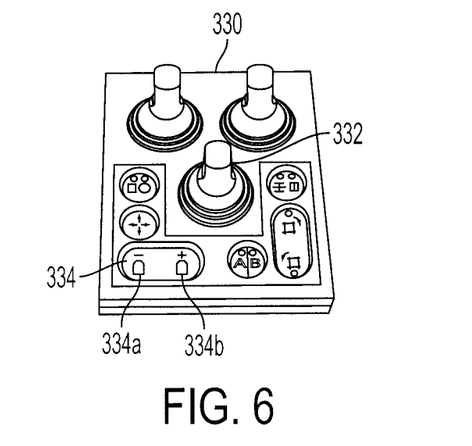
FIG. 6 is an enlarged perspective view of one control console of the exemplary set of control consoles of FIG. 5 that enables corresponding control of the zoom setting override process as exemplified in FIG. 4.

FIG. 6 illustrates the control console 330 that enables corresponding control, via the zoom setting override menu 212, of the zoom setting override process as exemplified in FIG. 4. More particularly, the control console 330 may include a joystick 332 that controls collimation of the anatomical images 22, 22A to 22F displayed on the main image display 20 or on the touch-screen display 100, and a zoom setting button 334. The zoom setting button 334 is a dual function button having a first portion 334a which, upon being pressed by the user U, advances to zoom settings having decreased magnification or decreases the magnification of the zoom settings, and is therefore labeled (−), and a second portion 334b which, upon being pressed by the user U, advances to zoom settings having increased magnification or increases the magnification of the zoom settings, and is therefore labeled (+). The operation of the control console 330 and the zoom setting button 334 is explained in more detail below.

Referring to FIGS. 1 and 4, the pre-defined field of view 52 defines a maximum analog zoom field of view 54, represented by, for example, Zoom 0 in FIG. 4, that is illustrated as having a corresponding dimension of 48 centimeters (cm). The maximum analog zoom field of view 54 corresponds to the maximum analog zoom setting 222, illustrated as Zoom 0 in FIG. 4. The pre-defined field of view 52 also defines a minimum analog zoom field of view 56, represented by, for example, Zoom 4 in FIG. 4, for at least one anatomical image, e.g., anatomical images 22, 22A to 22F, in FIGS. 1-2. The minimum analog zoom field of view 56 corresponds to a minimum analog zoom setting 230, illustrated as Zoom 4 in FIG. 4, for at least one anatomical image, e.g., anatomical images 22, 22A to 22F. The sub-system 200 further includes the image display or main monitor 20 that displays the at least one anatomical image, e.g., anatomical images 22, 22A to 22F, within the pre-defined field of view 52; the processing unit 32 providing a selection of at least one anatomical image, e.g., anatomical images 22, 22A to 22F; and the network 36 that is configured to interface the detector 40 with the processing unit 32 and the image display 20 with the processing unit 32. The sub-system 200 is configured to enable establishment of at least one intervening selectable or digital zoom setting, e.g., Zoom 1, Zoom 2, or Zoom 3 in FIGS. 4-6, corresponding to at least one intervening selectable or digital zoom field of view 58, with a second intervening selectable or digital zoom field of view 60 and a third intervening selectable or digital zoom field of view 62, respectively, also being illustrated in FIG. 1, between the maximum analog zoom field of view 54 and the minimum analog zoom field of view 56, thereby establishing a first user profile 215 as indicated in FIG. 4. As defined herein, the intervening zoom settings are both selectable and digital. That is, the intervening zoom settings are analog and selectable in the sense that a particular value for an intervening zoom setting can be established by the user U but are digital in the sense that the particular value remains fixed until a different value is selected by the user U or by the sub-system 200, as explained in more detail below.

The display 210 displays the user profile 215 as a combination of the set 216 of individual zoom settings and a set 220 of corresponding current values listed under a heading 218 "Current Value". The set 216 of individual zoom settings may range, for example, from zoom setting 222 for Zoom 0, the maximum analog field of view 54, to zoom setting 230 for Zoom 4, the minimum analog field of view 56. The set 216 of zoom settings may include intermediate or intervening selectable or digital zoom settings such as zoom setting 224 for Zoom 1, zoom setting 226 for Zoom 2, and zoom setting 228 for Zoom 3. The set 220 of corresponding current values are dimensional values 232, 234, 236, 238 and 240 of the individual zoom settings 222, 224, 226, 228 and 230, respectively. Additional or fewer zoom settings can be established by the user U if desired by appropriate configuration of system software residing in the processor 32, or accessible thereto via the network 36, at the control console 30, e.g., adding a Zoom 5 and a Zoom 6 while converting Zoom 4 to a Zoom 7.

As illustrated in FIG. 4, the first user profile 215 is established with zoom setting 222 for Zoom 0, the maximum analog field of view 54 having a corresponding current value 232 of 48 centimeters. In addition, the zoom setting 224 for Zoom 1 has a corresponding pre-set or current value 234 of 42 centimeters; the zoom setting 226 for Zoom 2 has a corresponding pre-set or current value 236 of 32 centimeters; the zoom setting 228 for Zoom 3 has a corresponding pre-set or current value 238 of 22 centimeters; and the zoom setting 230 for Zoom 4, the minimum analog field of view 56, has a corresponding current value 240 of 11 centimeters.

The display 210 may include a "Cancel" button 250, that enables the user U to cancel the first user profile 215, and a "Help" button 252, to provide assistance to the user U with the operation of the sub-system 200. The sub-system 200 is configured such that upon logging on by the user U, the previously established user profile 215 appears on the display 210 when the zoom setting override menu 212 for the pre-set zoom settings is activated. At least one of the intermediate or intervening pre-set zoom settings, e.g., zoom setting 224 for Zoom 1 and corresponding current value 234, zoom setting 226 for Zoom 2 and corresponding current value 236, and zoom setting 228 and corresponding current value 238, can be overridden with the current zoom setting of the detector 40. The zoom setting of the detector 40 can be set by stepping through the preset values via the dual function button 334 having the first portion 334a which, upon being pressed by the user U, decreases the magnification of the zoom settings or advances to zoom settings having decreased magnification, and the second portion 334b which, upon being pressed by the user U, increases the magnification of the zoom settings or advances to zoom settings having increased magnification, as described above. The zoom setting of the detector 40 can also be set by using the collimator control joystick 332, or a combination of both the joystick 332 and the dual function magnification button 334.

Figure 7:
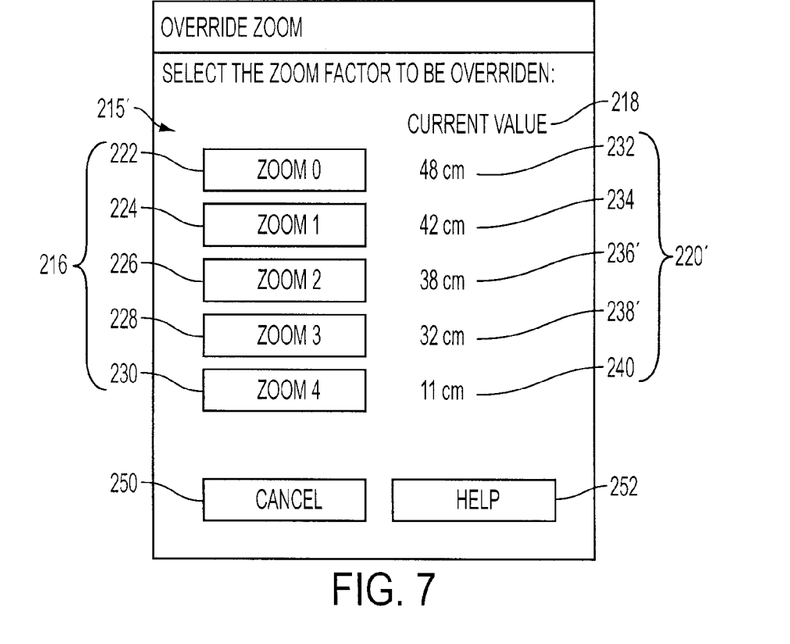
FIG. 7 is an exemplary display of an exemplary override of a zoom setting for the display of anatomical images according to the present disclosure.
Figure 8:
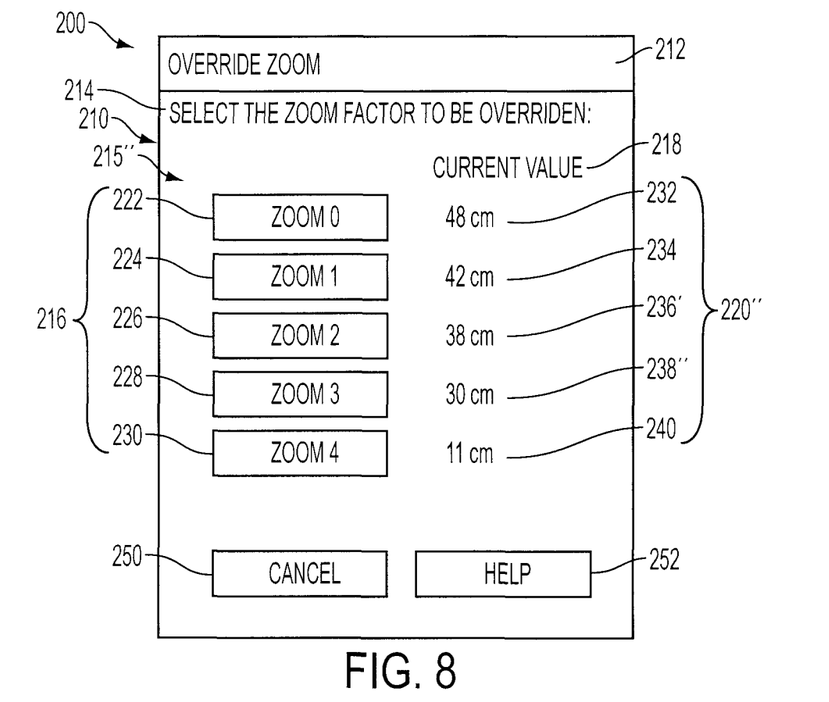
FIG. 8 is an exemplary display of another exemplary override of a zoom setting for the display of anatomical images according to the present disclosure.

As illustrated in FIGS. 4 and 7-8, the sub-system 200 is configured such that the display 210 displays the maximum analog zoom setting 222 and corresponding current value 232; the at least one intervening selectable or digital zoom setting, e.g., zoom settings 224, 226 and 228 for Zoom 1, Zoom 2 and Zoom 3 and corresponding current values 234, 236 and 238, respectively; and the minimum analog zoom setting 230 and corresponding current value 240 in one of a descending order and an ascending order on the image display 210. More particularly, the first user profile 215 is displayed in descending order in FIG. 4, although display of the user profile 215 is not limited to either a descending order or an ascending order.

As described above with respect to FIG. 1, the sub-system 200 may also be configured with at least two intervening digital fields of view, e.g., first intervening field of view 58 corresponding to zoom setting 224 for Zoom 1, second intervening field of view 60 corresponding to zoom setting 226 for Zoom 2, and third intervening field of view 62 corresponding to zoom setting 228 for Zoom 3, displayed on the image display 210 such that the user U is able to select an intervening selectable analog zoom setting to override one of the at least two intervening selectable zoom settings.

More particularly, referring to FIG. 7, the set 216 of zoom settings is unchanged in comparison to FIG. 4. However, the set 220 of corresponding current values is now replaced by a set 220' of corresponding current values in which the current value 236 for zoom setting 226, i.e., Zoom 2, has been selected to be replaced by an analog current value 236' of 38 centimeters as opposed to the previous current value 236 of 32 centimeters. In addition, the current value 238 in FIG. 4 of 22 centimeters has now been overridden by current value 238' in FIG. 7 of 32 centimeters, thereby establishing a second set of current values 220' that replaces the first set of current values 220 to create at least a second user profile 215'. Thus, the minimum analog zoom setting 230 for Zoom 4, having a corresponding current value of 11 centimeters; the selected intervening selectable zoom setting, e.g., zoom setting 226 for Zoom 2, having a corresponding current value 236' of 38 centimeters, overriding one of the at least two intervening selectable zoom settings, e.g., overriding intervening selectable zoom setting 226 for Zoom 2, having a corresponding previous value 236 of 32 centimeters; at least another one of the at least two intervening selectable zoom settings, e.g., intervening selectable zoom setting 224 for Zoom 1, having a corresponding current value 234 of 42 centimeters, intervening selectable zoom setting 228 for Zoom 3, having a corresponding current value 238' of 32 centimeters; and the maximum analog zoom setting 222 for Zoom 0, having a corresponding current value 232 of 48 centimeters establish the at least a second user profile 215' overriding the first user profile 215 via the second set of current values 220' that replaces the first set of current values 220 to create the at least a second user profile 215'.

Referring to FIGS. 7-8, in one embodiment, sub-system 200 may be configured such that the selected intervening selectable zoom setting, e.g., intervening selectable zoom setting 228 for Zoom 3 in FIG. 8, having a corresponding current value 238" of 30 centimeters, overrides one of the at least two intervening selectable zoom settings, e.g., intervening selectable zoom setting 224 for Zoom 1, having a corresponding current value 234 of 42 centimeters; intervening selectable zoom setting 226 for Zoom 2, having a corresponding current value 236' of 38 centimeters; and intervening selectable zoom setting 228 for Zoom 3, having a corresponding current value 238" of 30 centimeters, that is closest in dimensional value to the selected intervening selectable zoom setting, e.g., the selected intervening selectable zoom setting 238", having a current value of 30 centimeters (see FIG. 8), overrides the intervening selectable zoom setting 238', having a current value of 32 centimeters (see FIG. 7), that is closest in dimensional value to the selected intervening selectable zoom setting 238', having a current value of 30 centimeters, thereby establishing a third set of current values 220" that replaces the second set of current values 220' to create a third user profile 215" (see FIG. 8), of the first and the at least a second user profiles 215 and 215'. Thus, the user U is not forced to entirely override the previous user profile 215', since user profile 215" represents only a partial override of the previous user profile 215'. The sub-system 200 may be configured upon log-off to restore the previous user profile 215' upon subsequent log-on. The capability of only partially and temporarily overriding the previous user profile 215' by user profile 215" may be advantageous during operations such as release of the anatomical images 22, 22A to 22F as completed images.

Figure 9:
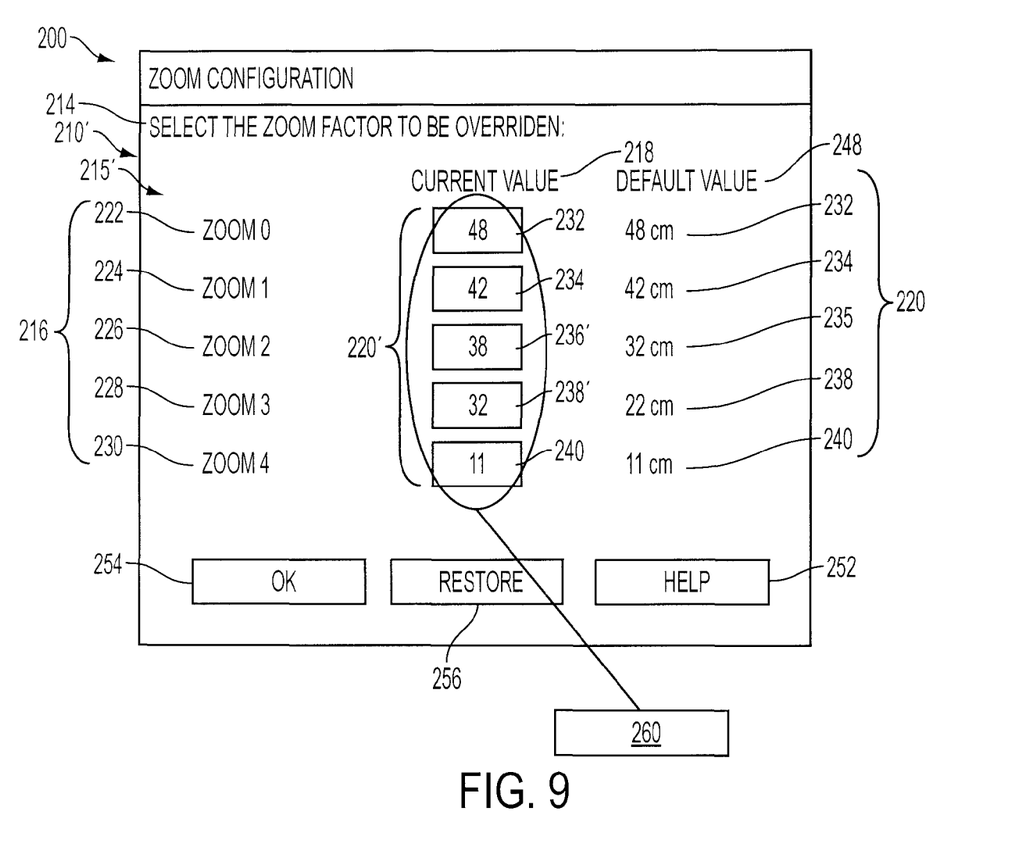
FIG. 9 is an exemplary display of current zoom settings versus default values of the zoom settings for the display of anatomical images according to the present disclosure.

FIG. 9 illustrates a display 210' for sub-system 200 that is identical to the display 210 of FIGS. 4 and 7-8 except that display 210' further includes the set 220 of current values listed under a heading 248 "Default Value". The set 220' of current values are now listed under the heading 218 "Current Value" as a set 260 of editable text fields. In addition to the "Help" button 252, the display 210' now includes an "OK" button 254 and a "Restore" button 256. The "Cancel" button 250 is omitted.

Prior to pressing the "OK" button 254 to enter a particular set of current values listed under the heading 218 "Current Value", the user U may edit the "Editable Text Fields" 260 to alter the set 220' of current values or the user U may leave the set 220' of current values unchanged.

The display 210' of sub-system 200 further includes the set 220 of current values that are listed under the heading 248 "Default Value", such that the set 220 of current values are the particular default values of the sub-system 200 at the particular time of display. By pressing the "Restore" button 256, the user U may restore the first user profile 215 upon subsequent log-on. The sub-system 200 may be configured, therefore, such that upon log-off, the first user profile 215 may be restored upon subsequent log-on. The first user profile 215 may be a default user profile. Alternatively, the sub-system 200 may be configured upon log-off to maintain the at least a second user profile, e.g., second user profile 215' or third user profile 215", upon subsequent log-on.

Referring to FIGS. 1-2, a condition may arise in which certain fields of view may be of such magnitude as to produce a viewed anatomical image of lower quality when zoomed to the magnitude of the display, e.g., displays 22, 22A to 22F, as compared to the quality of the same image presented on the display, e.g., displays 22, 22A to 22F, either in its native magnitude or zoomed to a magnitude very close to the magnitude of the display, e.g., displays 22, 22A to 22F. For example, a 960×960 square matrix of a 20 centimeter×20 centimeter flat panel detector, e.g., detector 40 in FIG. 1, is sharper if displayed unzoomed or unmagnified than if zoomed to 1024×1024. To provide better image quality, the sub-system 200 may be configured such that anatomical images, e.g., an anatomical image such as images 22, 22A to 22F, for which such a condition might arise, may be displayed unzoomed.

Thus, in one embodiment, the sub-system 200 may be configured to inhibit an increase in zoom setting of the selected intervening selectable zoom setting, e.g., zoom setting 226 for Zoom 2 having a corresponding current value 236' of 38 centimeters, overriding one of the at least two intervening selectable zoom settings, e.g., current value 236 of 32 centimeters of the at least two intervening selectable zoom settings 224 for Zoom 1 and 228 for Zoom 3.

Referring to FIGS. 1 and 4-9, as described above, if desired, the software of sub-system 200 may be configured such that the user U may add additional zoom settings, e.g., new zooms 5 and 6 (not shown) may be added while converting zoom 4 to zoom 7 (not shown). Thus, the sub-system 200 may be configured to reset the pre-defined field of view 52 by re-defining, for at least one anatomical image, e.g., anatomical images 22, 22A to 22F, at least one of (a) the pre-defined field of view defining the maximum analog zoom field of view 54 corresponding to the maximum analog zoom setting 222 for Zoom 0; and (b) the pre-defined field of view defining the minimum analog zoom field of view 56 corresponding to the minimum analog zoom setting 230 for Zoom 0.

The present disclosure relates also to a method for selecting a zoom size of an anatomical image for display. The method includes the steps of: providing an image detector having a pre-defined field of view, the pre-defined field of view defining a maximum analog zoom field of view corresponding to a maximum analog zoom setting and a minimum analog zoom field of view corresponding to a minimum analog zoom setting for at least one anatomical image; and an image display displaying the at least one anatomical image within the pre-defined field of view; and establishing at least one intervening selectable zoom setting corresponding to an intervening selectable field of view between the maximum analog zoom and the minimum analog zoom, thereby establishing a user profile.

For example, the method may be implemented as described above with respect to FIGS. 4-8, via the sub-system 200 which is a system included within the system 10. The sub-system 200 includes the image detector 40 having a pre-defined field of view 52 (see FIG. 1) with respect to the patient P. Referring to FIG. 4, the sub-system 200 includes the display 210 that can be displayed either on the control console 30 (see FIG. 1) or on the touch-screen display 100. The display 210 may display the menu header 212 labeled "Override Zoom", an action prompt identifier 214 labeled "Select the Zoom factor to be overridden", and a set 216 of zoom settings, illustrated, for example, as Zoom 0, Zoom 1, Zoom 2, Zoom 3 and Zoom 4.

The pre-defined field of view 52 defines a maximum analog zoom field of view 54, represented by, for example, Zoom 0 in FIG. 4, that is illustrated as having a corresponding dimension of 48 centimeters (cm). The maximum analog zoom field of view 54 corresponds to the maximum analog zoom setting 222, illustrated as Zoom 0 in FIG. 4. The pre-defined field of view 52 also defines a minimum analog zoom field of view 56, represented by, for example, Zoom 4 in FIG. 4, for at least one anatomical image, e.g., anatomical images 22, 22A to 22F, in FIGS. 1-2. The minimum analog zoom field of view 56 corresponds to a minimum analog zoom setting 230, illustrated as Zoom 4 in FIG. 4, for at least one anatomical image, e.g., anatomical images 22, 22A to 22F. The sub-system 200 further includes the image display or main monitor 20 that displays the at least one anatomical image, e.g., anatomical images 22, 22A to 22F, within the pre-defined field of view 52; the processing unit 32 providing a selection of at least one anatomical image, e.g., anatomical images 22, 22A to 22F; and the network 36 that is configured to interface the detector 40 with the processing unit 32 and the image display 20 with the processing unit 32. The sub-system 200 is configured to enable establishment of at least one intervening selectable zoom setting, e.g., Zoom 1, Zoom 2, or Zoom 3 in FIGS. 4 and 7-8, corresponding to at least one intervening selectable zoom field of view 58, with a second intervening selectable zoom field of view 60 and a third intervening selectable zoom field of view 62, respectively, also being illustrated in FIG. 1, between the maximum analog zoom field of view 54 and the minimum analog zoom field of view 56, thereby establishing a first user profile 215 as indicated in FIG. 4.

The method may further include the step of enabling the at least the at least one intervening zoom setting to be overridden. For example, as described above, the method may be implemented via the current value 238 in FIG. 4 of 22 centimeters being overridden by current value 238' in FIG. 7 of 32 centimeters, thereby establishing a second set of current values 220' that replaces the first set of current values 220 to create at least a second user profile 215'.

The method may further include the step of ordering the maximum analog zoom setting, the at least one intervening selectable zoom setting, and the minimum analog zoom setting in one of a descending order and an ascending order. For example, as described above with respect to FIGS. 4-8, the method may be implemented via the sub-system 200 being configured such that the display 210 displays the maximum analog zoom setting 222 and corresponding current value 232; the at least one intervening selectable zoom setting, e.g., zoom settings 224, 226 and 228 for Zoom 1, Zoom 2 and Zoom 3 and corresponding current values 234, 236 and 238, respectively; and the minimum analog zoom setting 230 and corresponding current value 240 in one of a descending order and an ascending order on the image display 210. More particularly, the first user profile 215 is displayed in descending order in FIG. 4, although display of the user profile 215 is not limited to either a descending order or an ascending order.

The method may also further include the steps of: providing at least two intervening selectable zoom settings; and overriding one of the at least two intervening selectable zoom settings by a selected intervening selectable zoom setting. For example, as described above with respect to FIGS. 1 and 4-8, the method may be implemented via the sub-system 200 being configured with at least two intervening selectable fields of view, e.g., first intervening field of view 58 corresponding to zoom setting 224 for Zoom 1, second intervening field of view 60 corresponding to zoom setting 226 for Zoom 2, and third intervening field of view 62 corresponding to zoom setting 228 for Zoom 3, displayed on the image display 210 such that the user U is able to select an intervening selectable zoom setting to override one of the at least two intervening selectable zoom settings.

More particularly, referring to FIG. 7, the set 216 of zoom settings is unchanged in comparison to FIG. 4. However, the set 220 of corresponding current values is now replaced by a set 220' of corresponding current values in which the current value 236 for zoom setting 226, i.e., Zoom 2, has been selected to be replaced by an analog current value 236' of 38 centimeters as opposed to the previous current value 236 of 32 centimeters. In addition, the current value 238 in FIG. 4 of 22 centimeters has now been overridden by current value 238' in FIG. 5 of 32 centimeters, thereby establishing a second set of current values 220' that replaces the first set of current values 220 to create at least a second user profile 215'. Thus, the minimum analog zoom setting 230 for Zoom 4, having a corresponding current value of 11 centimeters; the selected intervening selectable zoom setting, e.g., zoom setting 226 for Zoom 2, having a corresponding current value 236' of 38 centimeters, overriding one of the at least two intervening selectable zoom settings, e.g., overriding intervening selectable zoom setting 226 for Zoom 2, having a corresponding previous value 236 of 32 centimeters; at least another one of the at least two intervening selectable zoom settings, e.g., intervening selectable zoom setting 224 for Zoom 1, having a corresponding current value 234 of 42 centimeters, intervening selectable zoom setting 228 for Zoom 3, having a corresponding current value 238' of 32 centimeters; and the maximum analog zoom setting 222 for Zoom 0, having a corresponding current value 232 of 48 centimeters establish the at least a second user profile 215' overriding the first user profile 215 via the second set of current values 220' that replaces the first set of current values 220 to create the at least a second.

The method may also be implemented wherein the selected intervening selectable zoom setting overrides one of the at least two intervening selectable zoom settings closest in dimensional value to the selected intervening selectable zoom setting. In addition, the method may further include the step of establishing a second user profile overriding the first user profile, the second user profile being the minimum analog zoom setting, the selected intervening selectable zoom setting, another one of the at least two intervening selectable zoom settings, and the maximum analog zoom setting.

For example, as described above with respect to FIGS. 7-8, the selected intervening selectable zoom setting 238", having a current value of 30 centimeters (see FIG. 8), overrides the intervening selectable zoom setting 238', having a current value of 32 centimeters (see FIG. 7), that is closest in dimensional value to the selected intervening selectable zoom setting 238', having a current value of 30 centimeters, thereby establishing a third set of current values 220" that replaces the second set of current values 220' to create a third user profile 215" (see FIG. 8), of the first and the at least a second user profiles 215 and 215'. In addition, the method may include the step of following log-off, restoring the first user profile 215 upon subsequent log-on. As described above in conjunction with FIG. 9, the method may be implemented wherein the first user profile 215 is a default user profile, e.g., the display 210' of sub-system 200 further includes the set 220 of current values that are listed under the heading 248 "Default Value", such that the set 220 of current values are the particular default values of the sub-system 200 at the particular time of display.

Alternatively, the method may further include the step of, following log-off, maintaining the second user profile upon subsequent log-on. For example, as described above with respect to FIG. 9, the sub-system 200 may be configured upon log-off to maintain the at least a second user profile, e.g., second user profile 215' or third user profile 215", upon subsequent log-on.

The method may also include the step of inhibiting an increase in zoom setting of the selected intervening selectable zoom setting overriding one of the at least two intervening selectable zoom settings. For example, as described above with respect to FIGS. 1-2, to provide better image quality, the sub-system 200 may be configured such that anatomical images, e.g., an anatomical image such as images 22, 22A to 22F, for which a condition may arise in which certain fields of view may be of such magnitude as to produce a viewed anatomical image of lower quality when zoomed to the magnitude of the display, e.g., displays 22, 22A to 22F, as compared to the quality of the same image presented on the display, e.g., displays 22, 22A to 22F, either in its native magnitude or zoomed to a magnitude very close to the magnitude of the display, e.g., displays 22, 22A to 22F, may be displayed unzoomed.

The method may further include the step of resetting the pre-defined field of view by re-defining, for at least one anatomical image, at least one of (a) the pre-defined field of view defining the maximum analog zoom field of view corresponding to a maximum analog zoom setting; and (b) the pre-defined field of view defining the minimum analog zoom field of view corresponding to a minimum analog zoom setting. For example, as described above, referring to FIGS. 1 and 4-7, the software of sub-system 200 may be configured such that the user U may add additional zoom settings, e.g., new Zooms 5 and 6 (not shown) may be added while converting Zoom 4 to Zoom 7 (not shown). Thus, the sub-system 200 may be configured to reset the pre-defined field of view 52 by re-defining, for at least one anatomical image, e.g., anatomical images 22, 22A to 22F, at least one of (a) the pre-defined field of view defining the maximum analog zoom field of view 54 corresponding to the maximum analog zoom setting 222 for Zoom 0; and (b) the pre-defined field of view defining the minimum analog zoom field of view 56 corresponding to the minimum analog zoom setting 230 for Zoom 0.

Although the anatomical image described herein is disclosed with respect to exemplary angiographic x-ray system 10, the embodiments of the present disclosure may be applied to other anatomical images and imaging systems such as, but not limited to, computer assisted tomography (CAT), magnetic resonance imaging (MRI), positron emission tomography (PET) and acoustic or sonogram images.

It will be understood that various modifications may be made to the embodiments disclosed herein. For example, although the above embodiments are described with reference to one particular configuration of the system, method and main panel and touch-screen displays, the embodiments of the present disclosure may find application in conjunction with a system, method and main panel and touch-screen displays having many different configurations. Accordingly, it is contemplated that the disclosure is not limited to such an application and may be applied to various embodiments.

What is claimed is:

1. A system employing at least one processing device in selecting a zoom size of an anatomical image for display, the system comprising:

a collimated X-ray radiation beam image detector device having a pre-defined field of view, the pre-defined field of view defining fixed zoom settings including, a maximum analog zoom field of view corresponding to a maximum analog zoom setting and a minimum analog zoom field of view corresponding to a minimum analog zoom setting for at least one anatomical image acquired using the image detector device and at least one of said zoom settings is set in response to radiation beam collimation control;

an image display displaying the at least one anatomical image within the pre-defined field of view;

a processing unit providing a selection of at least one anatomical image; and a network configured to interface the detector with the processing unit and the image display with the processing unit, wherein the system is configured to enable establishment in a user specific profile of at least one predetermined fixed intervening user selectable zoom setting independent of X-ray collimation setting, said selectable zoom setting corresponding to an intervening selectable zoom field of view between the maximum analog zoom field of view and the minimum analog zoom field of view.

2. The system according to claim 1, wherein the system is configured to inhibit use of the at least one intervening zoom setting to prevent reduction in image quality.

3. The system according to claim 1, wherein the maximum analog zoom setting, the at least one intervening selectable zoom setting, and the minimum analog zoom setting are displayed in one of a descending order and an ascending order on the image display.

4. The system according to claim 3, further comprising at least two intervening selectable field of views displayed on said image display, wherein a selected intervening selectable zoom setting overrides one of the at least two intervening selectable zoom settings.

5. The system according to claim 4, wherein the selected intervening selectable zoom setting overrides one of the at least two intervening selectable zoom settings that is closest in dimensional value to the selected intervening selectable zoom setting.

6. The system according to claim 4, wherein the user profile is a first user profile and the minimum analog zoom setting, the selected intervening selectable zoom setting overriding one of the at least two intervening selectable zoom settings; at least another one of the at least two intervening selectable zoom settings; and the maximum analog zoom setting establish at least a second user profile overriding the first user profile.

7. The system according to claim 6, wherein the system is configured upon log-off to restore the first user profile upon subsequent log-on.

8. The system according to claim 7, wherein the first user profile is a default user profile.

9. The system according to claim 6, wherein the system is configured upon log-off to maintain the at least a second user profile upon subsequent log-on.

10. The system according to claim 6, wherein the system is configured to inhibit an increase in zoom setting of the selected intervening selectable zoom setting overriding one of the at least two intervening selectable zoom settings.

11. The system according to claim 1, wherein the system is configured to reset the pre-defined field of view by re-defining, for at least one anatomical image, at least one of (a) the pre-defined field of view defining the maximum analog zoom field of view corresponding to a maximum analog zoom setting; and (b) the pre-defined field of view defining the minimum analog zoom field of view corresponding to a minimum analog zoom setting.

12. A method implemented using at least one processing device for selecting a zoom size of an anatomical image for display, the method comprising the steps of:
using a collimated X-ray radiation beam image detector device having a pre-defined field of view, the pre-defined field of view defining fixed zoom settings including, a maximum analog zoom field of view corresponding to a maximum analog zoom setting and a minimum analog zoom field of view corresponding to a minimum analog zoom setting for at least one anatomical image acquired using the image detector device and at least one of said zoom settings is set in response to radiation beam collimation control; and
displaying the at least one anatomical image within the pre-defined field of view; and
enabling a user to configure in a user specific profile at least one predetermined fixed intervening user selectable zoom setting independent of X-ray collimation setting, said selectable zoom setting corresponding to an intervening selectable field of view between the maximum analog zoom and the minimum analog zoom.

13. The method according to claim 12, further comprising the step of:
inhibiting use of the at least one intervening zoom setting to prevent reduction in image quality.

14. The method according to claim 12, further comprising the step of:
ordering the maximum analog zoom setting, the at least one intervening selectable zoom setting, and the minimum analog zoom setting in one of a descending order and an ascending order.

15. The method according to claim 13, further comprising the steps of:
providing at least two intervening selectable zoom settings; and
overriding one of the at least two intervening selectable zoom settings by a selected intervening selectable zoom setting.

16. The method according to claim 15, wherein the selected intervening selectable zoom setting overrides one of the at least two intervening selectable zoom settings closest in dimensional value to the selected intervening selectable zoom setting.

17. The method according to claim 15, further comprising the step of:
establishing at least a second user profile overriding the first user profile, the at least a second user profile being the minimum analog zoom setting; the selected intervening selectable zoom setting; at least another one of the at least two intervening selectable zoom settings, and the maximum analog zoom setting.

18. The method according to claim 17, further comprising the step of:
following log-off, restoring the first user profile upon subsequent log-on.

19. The method according to claim 18, wherein the first user profile is a default user profile.

20. The method according to claim 17, further comprising the step of:
following log-off, maintaining the second user profile upon subsequent log-on.

21. The method according to claim 17, further comprising the step of:
inhibiting an increase in zoom setting of the selected intervening selectable zoom setting overriding one of the at least two intervening selectable zoom settings.

22. The method according to claim 12, further comprising the step of:
resetting the pre-defined field of view by re-defining, for at least one anatomical image, at least one of (a) the pre-defined field of view defining the maximum analog zoom field of view corresponding to a maximum analog zoom setting; and (b) the pre-defined field of view defining the minimum analog zoom field of view corresponding to a minimum analog zoom setting.

* * * * *